(12) United States Patent
van de Westerlo

(10) Patent No.: US 10,647,188 B2
(45) Date of Patent: May 12, 2020

(54) OPEN ROOF CONSTRUCTION FOR A VEHICLE, AND VEHICLE COMPRISING SUCH OPEN ROOF CONSTRUCTION

(71) Applicant: Inalfa Roof Systems Group B.V., Oostrum (NL)

(72) Inventor: Antonius Johannes Maria van de Westerlo, Veldhoven (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 26 days.

(21) Appl. No.: 16/212,172

(22) Filed: Dec. 6, 2018

(65) Prior Publication Data

US 2019/0176603 A1    Jun. 13, 2019

(30) Foreign Application Priority Data

Dec. 8, 2017   (DE) .................. 20 2017 107 486 U

(51) Int. Cl.
*B60J 10/82*    (2016.01)
*B60J 7/02*    (2006.01)
(Continued)

(52) U.S. Cl.
CPC ............... *B60J 10/82* (2016.02); *B60J 7/024* (2013.01); *B60J 7/043* (2013.01); *B60J 7/047* (2013.01); *B60J 10/24* (2016.02); *B60J 10/90* (2016.02)

(58) Field of Classification Search
CPC ....................................................... B60J 10/82
(Continued)

(56) References Cited

U.S. PATENT DOCUMENTS 4,650,243 A    3/1987 Hanley et al.
4,679,846 A    7/1987 Lux et al.
(Continued)

FOREIGN PATENT DOCUMENTS

DE    3802380 A    8/1988
DE    9302762 U1   5/1993
(Continued)

OTHER PUBLICATIONS

German Search Report, dated Sep. 10, 2018, for corresponding German Patent Application No. 202017107486.2, filed Dec. 8, 2017.

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle includes a stationary part, a movable first panel and a second panel. The first panel is movably supported by an operating mechanism guided in one or more rails of the stationary part extending at least along a part of the inner roof edge of the opening and rearwardly thereof. The first panel is movable by at least a panel support and is capable of moving with respect to one of the rails and thereby displacing the first panel rearwardly above the second panel. The second panel and/or inner roof edge and/or the stationary part is provided with a deformable seal capable of sealing a gap between the second panel and the adjacent inner roof edge of the fixed roof. The panel support is adapted to deform the seal when it moves through the gap between the second panel and the inner roof edge.

20 Claims, 5 Drawing Sheets

(51) Int. Cl.
  *B60J 7/043*    (2006.01)
  *B60J 10/24*    (2016.01)
  *B60J 10/90*    (2016.01)
  *B60J 7/047*    (2006.01)

(58) Field of Classification Search
  USPC .................................. 296/216.06–216.09
  See application file for complete search history.

(56) References Cited

U.S. PATENT DOCUMENTS

| | | | |
|---|---|---|---|
| 4,699,421 | A | 10/1987 | Schaetzler et al. |
| 4,741,573 | A | 5/1988 | Yokota |
| 4,923,246 | A | 5/1990 | Takahashi et al. |
| 4,978,165 | A | 12/1990 | Schreiter et al. |
| 4,995,665 | A | 2/1991 | Ichinose et al. |
| 5,026,113 | A | 6/1991 | DiCarlo et al. |
| 5,447,355 | A | 9/1995 | Kelm |
| 5,464,267 | A | 11/1995 | Racine |
| 5,632,523 | A | 5/1997 | Kelm |
| 5,707,102 | A | 1/1998 | Takahashi et al. |
| 6,416,122 | B1 | 7/2002 | Schwarz et al. |
| 6,443,520 | B1 * | 9/2002 | Schmaelzle .............. B60J 7/04 296/216.03 |
| 6,652,022 | B2 | 11/2003 | Pfalzgraf et al. |
| 6,805,402 | B2 | 10/2004 | Pfalzgraf |
| 7,178,862 | B2 | 2/2007 | Oechel |
| 7,182,400 | B2 | 2/2007 | Grimm |
| 7,828,376 | B2 | 11/2010 | Nellen |
| 7,850,230 | B2 | 12/2010 | Faerber |
| 7,878,581 | B2 | 2/2011 | Faerber et al. |
| 8,807,639 | B2 | 8/2014 | Sawada |
| 8,857,903 | B2 | 10/2014 | Nellen et al. |
| 9,845,002 | B2 * | 12/2017 | Nellen .................. B60J 7/043 |
| 2002/0145310 | A1 | 10/2002 | Schatzler et al. |
| 2002/0163227 | A1 | 11/2002 | Pfalzgraf et al. |
| 2005/0200165 | A1 | 9/2005 | Grimm et al. |
| 2005/0231007 | A1 | 10/2005 | Oechel |
| 2007/0114817 | A1 | 5/2007 | Becher et al. |
| 2009/0179462 | A1 | 7/2009 | Nellen |
| 2010/0164253 | A1 | 7/2010 | Faerber et al. |
| 2013/0307296 | A1 | 11/2013 | Sawada |
| 2015/0130227 | A1 * | 5/2015 | Dietl .................. B60J 7/0046 296/217 |
| 2017/0043650 | A1 | 2/2017 | Nellen |

FOREIGN PATENT DOCUMENTS

| | | |
|---|---|---|
| DE | 19713347 C1 | 5/1999 |
| DE | 10345855 A1 | 5/2005 |
| DE | 10348545 A1 | 5/2005 |
| DE | 20319522 U1 | 6/2005 |
| DE | 102004012525 A1 | 10/2005 |
| DE | 102004016461 A1 | 11/2005 |
| DE | 102005007031 A1 | 8/2006 |
| DE | 202014103089 U1 | 10/2015 |
| DE | 102015011639 A1 | 3/2017 |
| EP | 0381066 A2 | 8/1990 |
| EP | 1741588 A1 | 1/2007 |
| EP | 1790515 A1 | 5/2007 |
| EP | 2078630 A1 | 7/2009 |
| EP | 3130495 A1 | 2/2017 |
| FR | 2726512 A1 | 5/1996 |
| JP | 2012091575 A | 5/2012 |
| NL | 1014023 C2 | 7/2001 |
| WO | 2006086955 A1 | 8/2006 |
| WO | 2007079747 A1 | 7/2007 |

\* cited by examiner

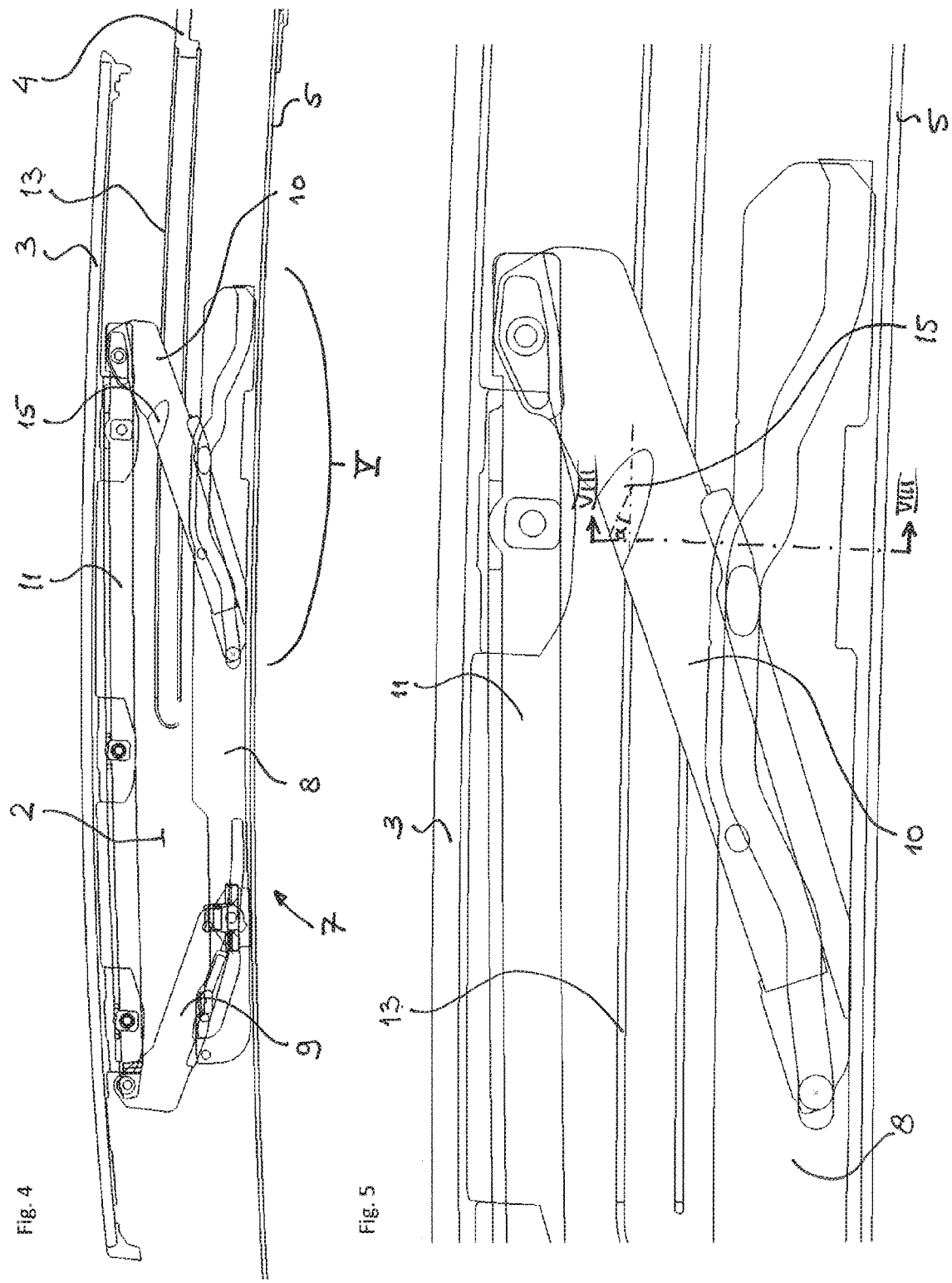

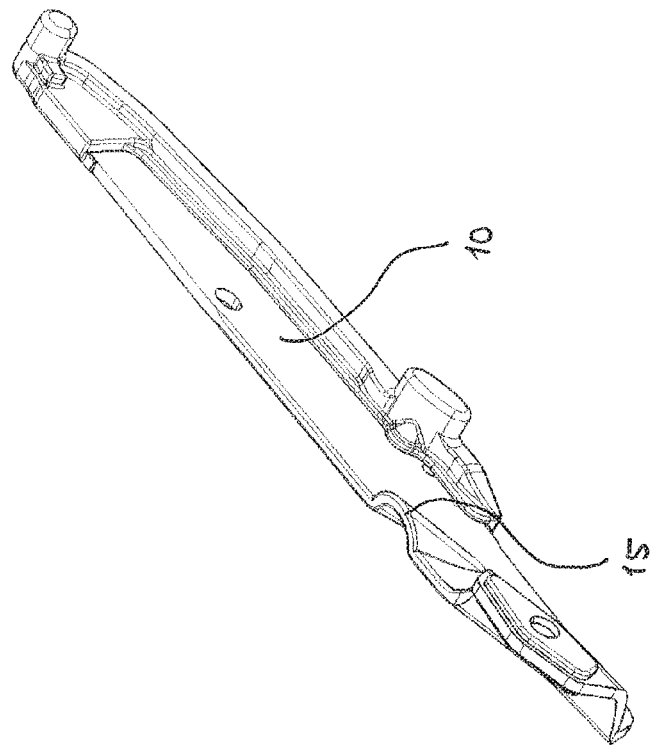
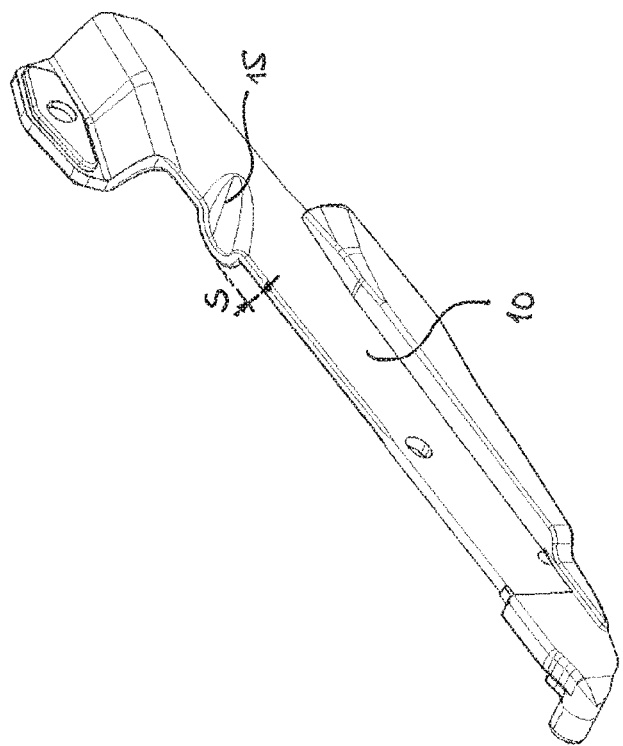

OPEN ROOF CONSTRUCTION FOR A VEHICLE, AND VEHICLE COMPRISING SUCH OPEN ROOF CONSTRUCTION

BACKGROUND

The discussion below is merely provided for general background information and is not intended to be used as an aid in determining the scope of the claimed subject matter.

Aspects of the invention relate to an open roof construction for a vehicle having a roof opening in a fixed roof portion thereof. The fixed roof portion has an inner roof edge defining the roof opening. The open roof construction includes a stationary part, at least a movable first panel and rearwardly thereof a second panel. The first panel is capable of at least partly opening and closing the roof opening and is movably supported by an operating mechanism guided in one or more guide rails of the stationary part extending at least along a part of the adjacent inner roof edge of the roof opening and rearwardly thereof. The first panel is movable by means of at least a panel support supporting at least a portion of the first panel and is capable of moving with respect to one of the guide rails and thereby displacing the first panel from a closed position in the roof opening upwardly and rearwardly above the second panel. At least one of the second panel, the inner roof edge and the stationary part is provided with a deformable seal capable of sealing a gap between the second panel and the adjacent inner roof edge of the fixed roof portion. The panel support is adapted to deform the seal when it moves through the gap between the second panel and the inner roof edge.

In practice it has been found that moving the panel support through the gap between the rear panel and the fixed roof portion can cause unwanted wear to the seal or seals and unwanted noises by the seals as a result of uncontrollable deformations of the seal. For example, if the orientation of the of the panel support is inclined, the panel support will move the seal upwards with its then front edge when it slides in one direction, and will move the seal downwards with its opposite edge when it slides in the opposite direction.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In the present disclosure, the panel support is provided with at least one sideward projection towards and at the level of the seal when the panel support moves through the gap between the second panel and the adjacent inner roof edge, the sideward projection being positioned and shaped to move the seal downwardly when the panel support moves through the gap.

Due to this sideward projection on the panel support, the deformation of the relevant seal is more controlled, i.e. always downwardly, thereby reducing noise and wear. Also the appearance of the seal is improved in a position in which the front panel is closed again if the seal is not moved upwardly by the panel support and therefore cannot remain in this upward position, which was sometimes the case in the prior art.

The seal cooperating with the sideward projection may be a panel seal attached to the second panel. Moving such seal downwardly by the sideward projection avoids unwanted plop-noises when the panel support moves out of the gap between the rear panel and the fixed roof portion, which was the case when the seal made uncontrolled up and down movements as a result of the asymmetric shape/position of the panel support.

The inner roof edge may be provided with a roof seal closing the gap together with the panel seal, but the panel support and the sideward projection may be positioned to deform only the panel seal, which is preferably formed as a bulb seal. In that case, there is only need for one sideward projection. In other cases, use could be made of two opposite projections cooperating with their corresponding seal.

In one embodiment, the sideward projection is formed as a bulge of the panel support, for example if the panel support is made of metal, the sideward projection may be deformed locally from the metal of the panel support.

Preferably, the sideward projection extends at least along an upper half of the seal when the panel support moves through the seal. This sufficient to control the deformation and cause the seal to move downwardly. In a particular embodiment, the sideward projection will extend only in the upper half of the seal.

The sideward projection is preferably elongated and a longitudinal center line thereof extends at an inclination to the longitudinal center line of the seal, the inclination of the center line of the sideward projection being e.g. between 5 and 45 degrees, particularly between 10 and 30 degrees, preferably around 20 degrees.

Such shape and orientation of the sideward projection is especially effective against the unwanted plop-noises when the panel support leaves the gap between the rear panel and the fixed roof portion while urging the seal upwardly.

The sideward projection will generally extend gradually towards a side surface of the panel support to reduce wear of the seal.

In one embodiment, the sideward projection is positioned adjacent a front side of the panel support and extends at least half of the longitudinal dimension of the panel support at the level of the sideward projection.

The panel support supports a rear portion of the first panel, although the invention may also be used in open roof constructions in which both the front and rear panel support move into the gap between the rear panel and the fixed roof portion.

The panel support will be a lever in most cases, but other panel supports, such as non-rotating elements, may be used as well.

In the case of a rear lever as panel support, it will generally extend rearwardly and upwardly when it moves through the gap between the panel seal and the fixed roof. In this case, without a sideward projection, the seal will be moved downwardly when the lever slides in rearward direction and will be moved upwardly when it slides in forward direction. This is due to the orientation of the edge of the lever that is directed in the direction of movement of the panel support. With the sideward projection always moving the seal downwardly, the sliding direction of the lever has no influence on the direction of movement or deformation of the seal.

As an example, the sideward dimension of the sideward projection is maximally between 2 and 8 mm, and preferably between 2 and 5 mm, from the adjacent side surface of the panel support.

BRIEF DESCRIPTION OF THE DRAWING

Further details and advantages follow from the below description of embodiments of the invention with reference to the drawings in which:

FIG. 4 is a side view of the operating mechanism and supported panel.

FIG. 5 is detail V in FIG. 4 on a larger scale.

FIGS. 6 and 7 are perspective views of the rear lever of the operating mechanism of FIGS. 3-5 from 2 different points of view.

DETAILED DESCRIPTION

Figure 1:
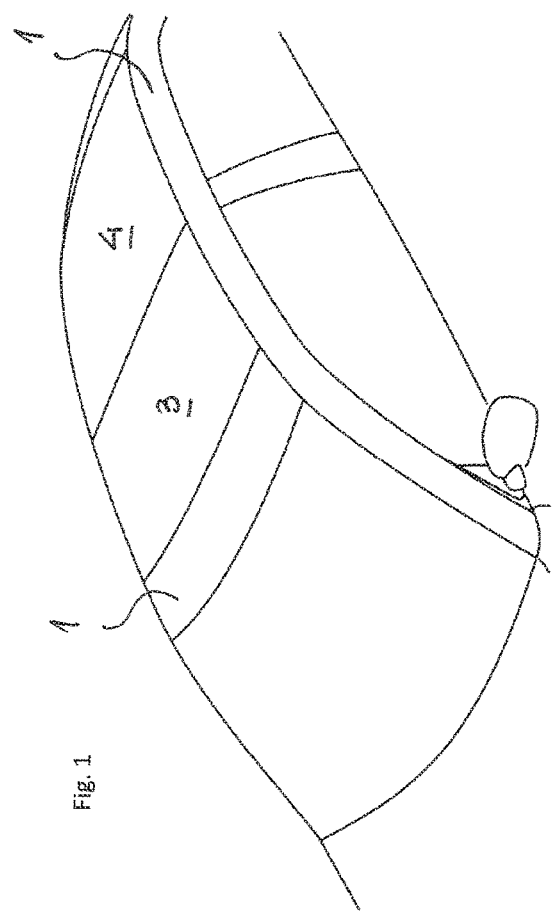
FIGS. 1 and 2 are schematic perspective views of a vehicle roof comprising an open roof construction showing two different positions of a panel thereof.
Figure 2:
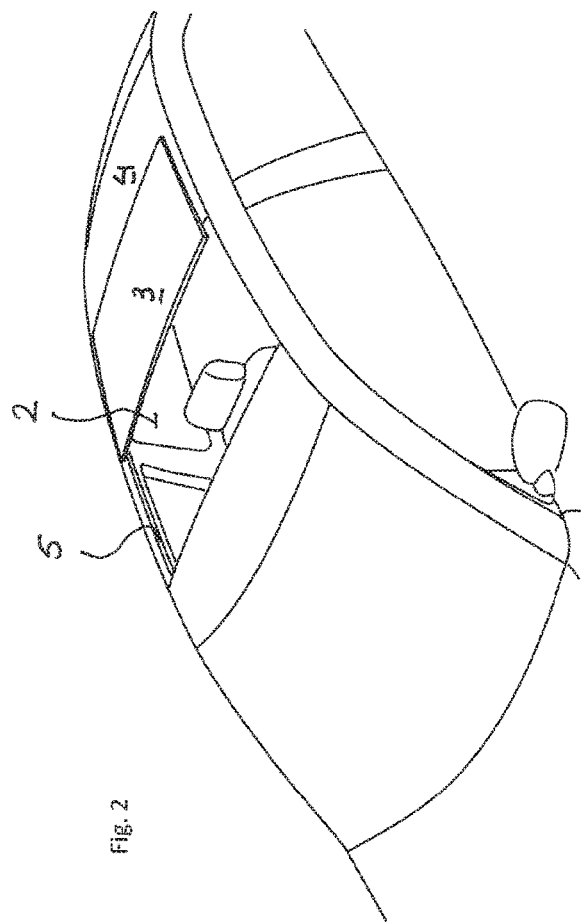

The drawings, and in first instance FIGS. 1 and 2, show a vehicle, such as a passenger car or utility vehicle, comprising a fixed roof portion 1, in which a roof opening 2 has been formed for the purpose of accommodating an open roof construction. The fixed roof portion 1 may be part of the vehicle or part of the open roof construction and replacing the normal roof of the vehicle. In this embodiment the roof assembly comprises a first or front closure element 3 and a second or rear closure element 4 which are both in the form of a rigid panel, which may or may not be transparent, and which together close the roof opening 2 in their closed position and of which at least the front panel can be opened from said closed position (FIG. 1). The front panel 3 can in any case be opened by moving the rear side of the panel 3 upwardly and sliding the panel 3 rearwardly over the second panel 4 (FIG. 2). The second closure element 4 is in this case a fixed panel.

FIG. 2 basically shows that to guide the front panel 3 there are provided guide rails 5 which are part of a stationary part of the open roof construction or are attached thereto, in which case the stationary part will generally be a frame. The guide rails 5 extend along the opposite longitudinal sides of roof opening 2, in this case not only at the position of front panel 3 (when closed), but also at the position of rear panel 4. These guide rails 5 may be continuous, or comprise two or more parts.

Figure 3:
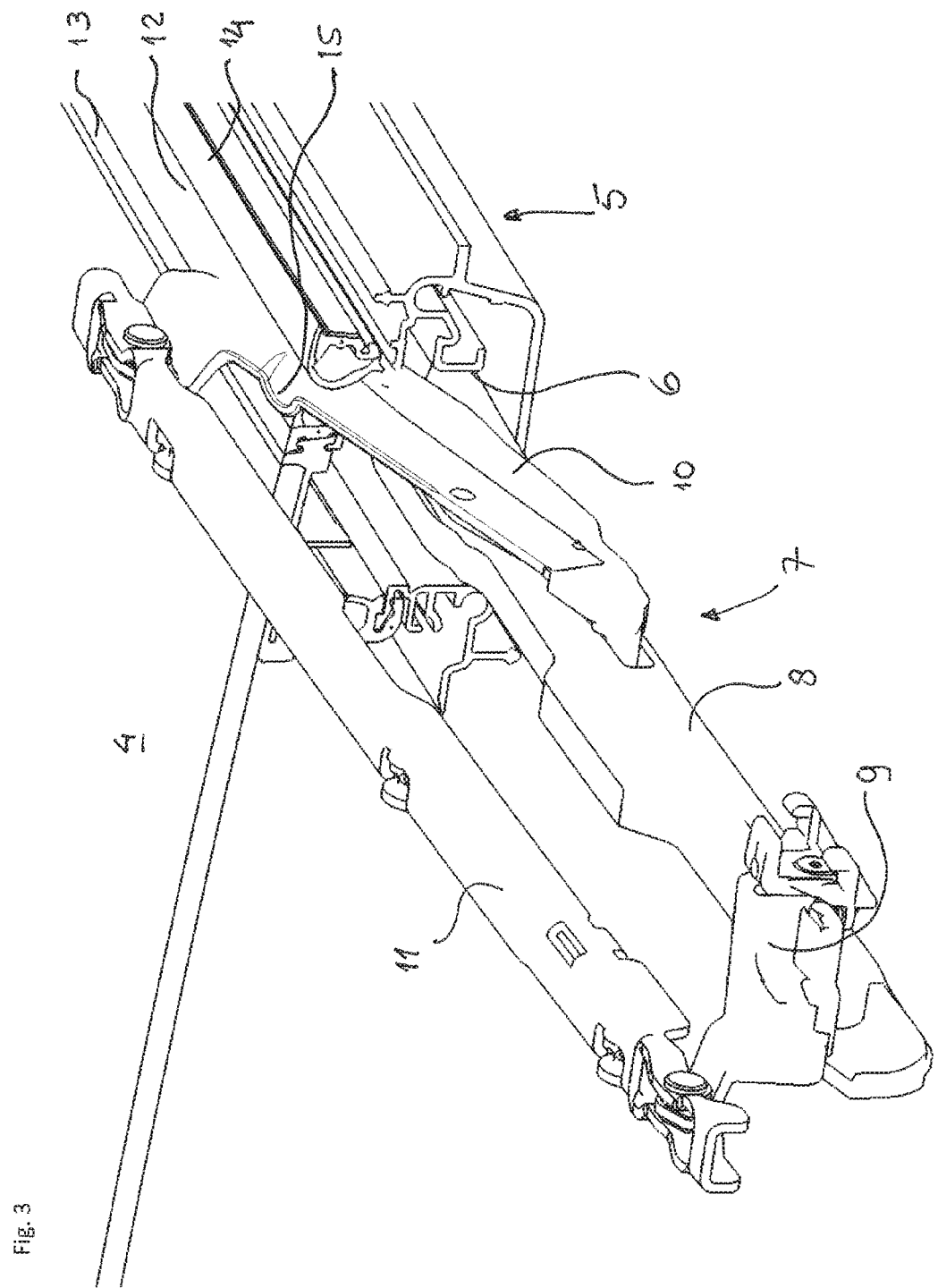
FIG. 3 is an enlarged, partly schematic perspective view of an operating mechanism for the movable roof panel.

FIG. 3 shows a part of one of such guide rails 5 at the position of the rear panel 4 and includes several guide grooves. A guide groove 6 is used to guide an operating mechanism 7 for front panel 3. This operating mechanism 7 includes a main slide 8, a front panel support 9 and a rear panel support 10, here in the form of levers 9, 10 which control the height of the front and rear side of panel 3 by means of main slide 8 and cooperating parts in guide rail 5. The levers 9, 10 may be aligned with each other in longitudinal direction of the roof. Levers 9 and 10 connect on their upper end to a panel bracket 11 attached to the lower side of panel 3, for example by bolting it to a panel enforcement which is fixed to panel 3 by encapsulation of plastic material or by gluing. The front lever 9 extends upwardly and forwardly, while rear lever 10 extends upwardly and rearwardly. The operating mechanism 7 will not be elucidated in further detail. Examples thereof are described and shown in DE 202014103089 and in U.S. Pat. No. 8,857,903, the complete content of which documents is incorporated herein by reference thereto.

Figure 8:
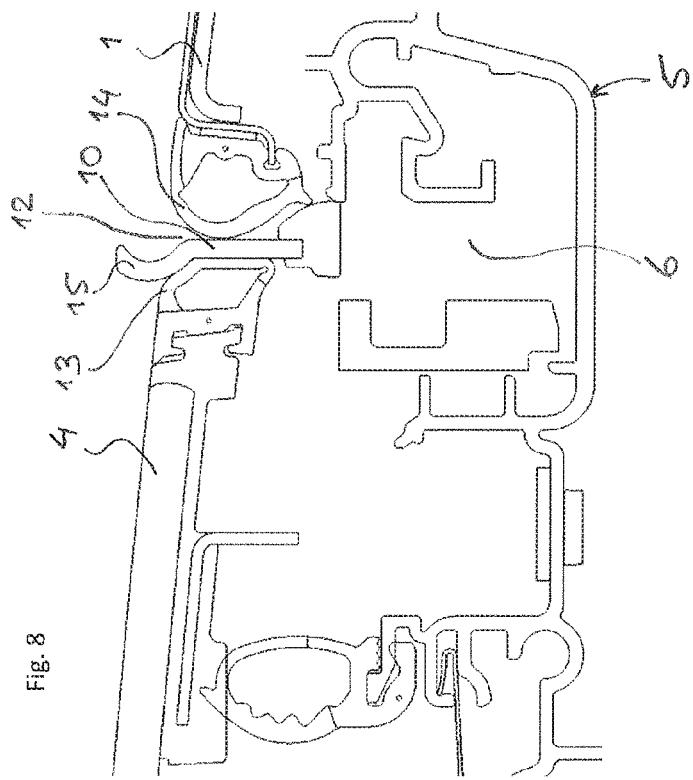
FIG. 8 is a sectional view according to line VIII-VIII in FIG. 5.

FIGS. 3, 4 and 5 show operating mechanism 7 in a fully raised and rearwardly slid position. Panel 3 can be moved rearwardly when operating mechanism 7 is in this fully raised position. Both the front and rear side of panel 3 have been raised then. The operating mechanism 7 may be such that slide 8 and connected levers 9 and 10 can be moved rearwardly to such an extent that front lever 9 passes beyond the front side of rear panel 4, so that in the rearmost position of front panel 3 both levers 9 and 10 are positioned besides rear panel 4, but this is not necessarily so and at least rear lever 10 may be moved through a gap 12 between rear panel 4 and an adjacent part of fixed roof portion 1. The gap 12 is such that it can receive at least rear lever 10, which in cross section extends substantially vertically and thus a cross section of gap 12 extends also substantially vertically. FIGS. 3 and 8 show that this gap 12 is normally closed by a sealing assembly, here comprising a hollow bulb-shaped panel seal 13 attached to rear panel 4 and a hollow bulb-shaped roof seal 14 attached either to a stationary part, such as guide rail 5, or to the fixed roof portion 1 as is shown here. It is attached to a substantially vertical surface of fixed roof portion 1.

In order to be able to move front panel 3 above rear panel 3 rear lever 10 must deform at least one of seals 13 and 14 to enter gap 12 between rear panel 4 and fixed roof portion 1. The deformable hollow bulb shape of seals 13 and 14 allow such deformation. In order to control this deformation, rear lever 1 is provided with at least one sideward projection 15. When rear lever 10 is in its position to move through gap 12 sideward projection 15 is positioned at the level of the upper half of panel seal 13, which in this case is the seal that is mainly deformed by rear lever 10. The position of sideward projection 15 with respect to panel seal 13 is clearly shown in FIG. 5 in which sideward projection is positioned only in the upper half of panel seal 13 and above seal 13.

FIG. 8 shows how panel seal 13 is deformed by rear lever 10 and by sideward projection 15 thereof. It is illustrated that panel seal 13, which is mounted to a substantially vertical surface of rear panel 4 is pushed downwardly by sideward projection 15 to suppress any tendency of panel seal 13 to move upwards. This control of the direction of deformation of panel seal 13 prevents unwanted movements and noises, and reduces wear thereof.

FIGS. 6 and 7 show that sideward projection 15 has a rounded shape and/or cross-section and extends gradually towards the side surface of rear lever 10, which side surface here extends mainly along a substantially vertical plane. In this case, the cross-section is rounded and the projection extends substantially linearly to the side surface of lever 10 in a direction perpendicularly thereto. Sideward projection 15 has more or less the shape of a part of an oval in sideward view (FIGS. 4 and 5) and the long center line thereof extends rearwardly and downwardly at an angle α (see FIG. 5) with respect to the longitudinal axis of panel seal 13. This angle α may be chosen between 5 and 45 degrees, preferably between 10 and 30 degrees, here around 20 degrees. The maximum sideward dimension S (see FIG. 6) of sideward projection 15 as measured from the adjacent side surface of rear lever 10 is 2-8 mm, preferably 2-5 mm. The sideward dimension S is at a maximum at the front edge of rear lever 10 and gradually diminishes in rearward direction. The sideward projection is formed as a deformation of the metal lever 10, i.e. as a bulge in the main body of rear lever 10 and extends along more than half of the dimension of rear lever 10 measured in longitudinal direction and at the level of sideward projection 15.

The downward movement of the seal 13 by sideward projection 15 shown and described is especially effective when lever 10 moves in forward direction, which would otherwise lead to an upward movement of seal 13 due to the upward orientation of the edge of lever 10 that is directed in the sliding direction of lever 10. When lever 10 slides in rearward direction through gap 12, then seal 13 will be moved downwardly anyhow by the downwardly directed edge of lever 10 that is now directed in the sliding direction of lever 10. Thus, the sideward projection should operate to move seal 13 in downward direction at least in one sliding direction of lever 10, but preferably in both. The latter is for example desired if both edges of the panel support are directed in an upward direction when it moves through gap 12.

Figure 9:
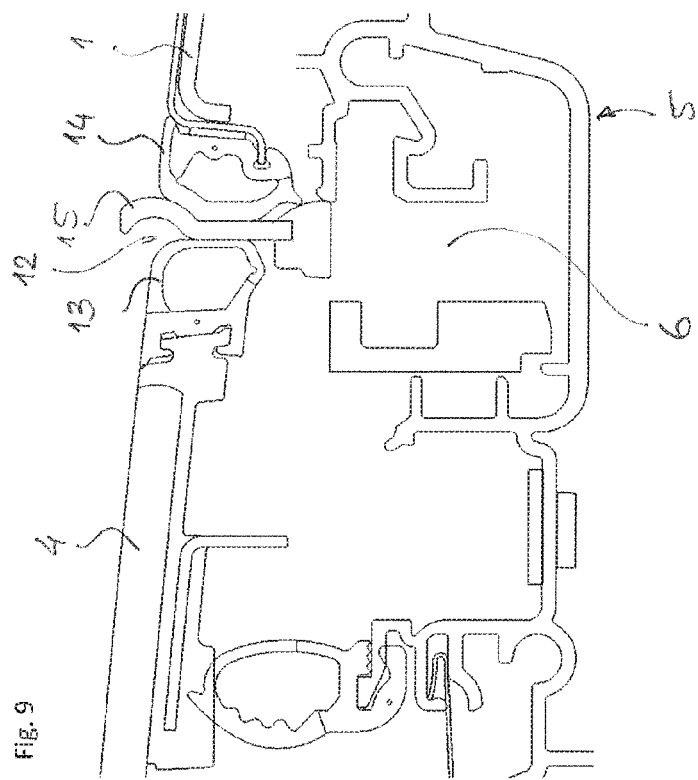
FIG. 9 is a sectional view corresponding to that of FIG. 8, but showing another embodiment.

FIG. 9 shows a second embodiment in which the sideward projection projects in the direction of roof seal 14, such that rear lever 10 deforms roof seal 14 in the direction of fixed roof 1 and wherein sideward projection 15 pushes the upper half of roof seal 14 down.

Further variations are conceivable as well. It is e.g. possible to provide a sideward projection on both sides of rear lever 10 or other panel support to deform the relevant seals in a desired direction. Such opposite sideward projections may be mirror-images of each other or shaped and/or positioned differently depending on the seals and structure of the panel support(s). The sideward projection may also extend in the lower half of the seal, but then it should preferably project more in the upper half of the seal than in the lower half, so that the seal will still be urged downwardly. The extent to which the sideward projection projects at its lower edge may be more than at its upper edge as the position of the panel support with respect to the seal is not important there in view of the deformation of the seal. Thus, the panel support may be stepped gradually at the height of the seal. The sideward projection may extend along the whole panel support body in a direction parallel to the longitudinal axis of the seal(s) or just along a part thereof as is shown in the drawings.

From the foregoing it will be clear that the invention provides a panel support causing a better appearance of the sealing means in an open roof construction when the front panel is opened, and reduced wear and noise when moving past those seals.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. An open roof construction for a vehicle having a roof opening in a fixed roof portion thereof, the fixed roof portion having an inner roof edge defining the roof opening, the open roof construction comprising:
   a stationary part having one or more guide rails extending at least along a part of the inner roof edge of the roof opening and rearwardly thereof;
   at least a movable first panel configured to at least partly open and close the roof opening;
   a second panel rearwardly of the first panel;
   an operating mechanism guided in said one or more guide rails and supporting the first panel, the first panel being movable by means of at least a panel support supporting at least a portion of the first panel and movable with respect to one of the guide rails to displace the first panel from a closed position in the roof opening upwardly and rearwardly above the second panel, the second panel and/or the inner roof edge and/or the stationary part being provided with a deformable seal capable of sealing a gap between the second panel and the adjacent inner roof edge of the fixed roof portion, the panel support being configured to deform the seal when the panel support moves through the gap between the second panel and the inner roof edge, wherein the panel support is provided with at least one sideward projection extending away from an adjacent side surface of the panel support towards and at a level of the deformable seal when the panel support moves through the gap between the second panel and the adjacent inner roof edge, the sideward projection being positioned and shaped to move the deformable seal downward when the panel support moves through the gap.

2. The open roof construction according to claim 1, wherein the deformable seal is a panel seal attached to the second panel.

3. The open roof construction according to claim 2, wherein the inner roof edge is provided with a roof seal closing the gap together with the panel seal.

4. The open roof construction according to claim 3, wherein the panel support and the sideward projection are positioned to deform only the panel seal, which is formed as a bulb seal.

5. The open roof construction according to claim 1, wherein the sideward projection is formed as a bulge of the panel support.

6. The open roof construction according to claim 1, wherein the sideward projection extends at least along an upper half of the deformable seal when the panel support moves through the deformable seal.

7. The open roof construction according to claim 1, wherein the sideward projection is elongated and a longitudinal center line thereof extends at an inclination to a longitudinal axis of the deformable seal.

8. The open roof construction according to claim 7, wherein the inclination of the center line of the sideward projection is between 5 and 45 degrees.

9. The open roof construction according to claim 8, wherein the inclination is between 10 and 30 degrees.

10. The open roof construction according to claim 8, wherein the inclination is about 20 degrees.

11. The open roof construction according to claim 1, wherein the sideward projection gradually extends towards a side surface of the panel support.

12. The open roof construction according to claim 11, wherein the sideward projection is located on the panel support starting at a forward facing edge when the panel support moves through the gap between the second panel and the inner roof edge.

13. The open roof construction according to claim 1, wherein the panel support supports a rear portion of the first panel.

14. The open roof construction according to claim 1, wherein the panel support is a lever.

15. The open roof construction according to claim 14, wherein the lever extends rearwardly and upwardly when it moves through the gap between the deformable seal and the fixed roof.

16. The open roof construction according to claim 1, wherein the panel support is made of metal and the sideward projection is deformed locally by the metal of the panel support.

17. The open roof construction according to claim 1, wherein sideward dimension of the sideward projection is maximally between 2 and 8 mm from the adjacent side surface of the panel support.

18. The open roof construction according to claim 1, wherein a sideward dimension of the sideward projection is maximally between 2 and 5 mm from the adjacent side surface of the panel support.

19. An open roof construction for a vehicle having a roof opening in a fixed roof thereof, the fixed roof having an inner roof edge defining the roof opening, the open roof construction comprising:

a stationary part having one or more guide rails extending at least along a part of the inner roof edge of the roof opening and rearwardly thereof;

at least a movable first panel configured to at least partly open and close the roof opening;

a second panel rearwardly of the first panel;

an operating mechanism guided in one or more guide rails of the stationary part and supporting the first panel, the first panel being movable by means of at least a panel support supporting at least a portion of the first panel and movable with respect to one of the guide rails to displace the first panel from a closed position in the roof opening upwardly and rearwardly above the second panel, the second panel being provided with a panel seal configured to seal a gap between the second panel and the adjacent inner roof edge of the fixed roof, the panel support being configured to deform at least the panel seal of the second panel when the panel support moves through the gap between the second panel and the inner roof edge of the fixed roof, wherein the panel support is provided with a sideward projection towards and at a level of the panel seal on the second panel when the panel support moves through the gap between the panel seal of the second panel and the adjacent inner roof edge, the sideward projection being positioned and shaped to move the panel seal downward when the panel support moves through the gap.

20. A vehicle having an inner roof edge defining a roof opening in a fixed roof and an open roof construction, the open roof construction comprising:

a stationary part having one or more guide rails extending at least along a part of the inner roof edge of the roof opening and rearwardly thereof;

at least a movable first panel configured to at least partly open and close the roof opening;

a second panel rearwardly of the first panel;

a lever supporting at least a portion of the first panel and movable with respect to the second panel to displace the first panel from a closed position in the roof opening upwardly and rearwardly above the second panel, the second panel being provided with a panel seal configured to seal a gap between the second panel and the adjacent inner roof edge of the fixed roof, the lever being configured to deform at least the panel seal of the second panel when the lever moves through the gap between the second panel and the inner roof edge of the fixed roof, wherein the lever is provided with a sideward projection towards and at a level of the panel seal on the second panel when the lever moves through the gap between the panel seal of the second panel and the adjacent inner roof edge, the sideward projection being positioned and shaped to move the panel seal downward when the lever moves through the gap.

\* \* \* \* \*